(12) United States Patent
You et al.

(10) Patent No.: US 12,196,875 B2
(45) Date of Patent: Jan. 14, 2025

(54) 3D WIRELESS OPTICAL POSITIONING METHOD AND SYSTEM

(71) Applicant: SOOCHOW UNIVERSITY, Suzhou (CN)

(72) Inventors: Xiaodi You, Suzhou (CN); Xiaobo Yang, Suzhou (CN); Zile Jiang, Suzhou (CN); Gangxiang Shen, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 316 days.

(21) Appl. No.: 17/908,054

(22) PCT Filed: Sep. 6, 2021

(86) PCT No.: PCT/CN2021/116639
§ 371 (c)(1),
(2) Date: Aug. 30, 2022

(87) PCT Pub. No.: WO2023/029028
PCT Pub. Date: Mar. 9, 2023

(65) Prior Publication Data
US 2023/0280442 A1    Sep. 7, 2023

(30) Foreign Application Priority Data

Aug. 31, 2021 (CN) .......................... 202111016290.5

(51) Int. Cl.
*G01S 5/16* (2006.01)
(52) U.S. Cl.
CPC ...................... *G01S 5/16* (2013.01)
(58) Field of Classification Search
CPC ........................................................ G01S 5/16
See application file for complete search history.

(56) References Cited

U.S. PATENT DOCUMENTS

| 2013/0194128 A1 | 8/2013 | Van Der Merwe |
| 2017/0276767 A1 | 9/2017 | Ho et al. |
| 2017/0317746 A1* | 11/2017 | Xu .................... H04B 10/07955 |

FOREIGN PATENT DOCUMENTS

| CN | 107037404 A | * | 8/2017 | ............... G01S 5/16 |
| CN | 107167768 A | * | 9/2017 | ............... G01S 5/16 |

(Continued)

OTHER PUBLICATIONS

Ajmani, Manisha et al. "Optical Wireless Communication Based Indoor Positioning Algorithms: Performance Optimisation and Mathematical Modelling", Dec. 20, 2018, MDPI, Computation, vol. 7, 1; doi: 10.3390/computation7010001.*

(Continued)

*Primary Examiner* — Manuel L Barbee
(74) *Attorney, Agent, or Firm* — SZDC Law PC (57) ABSTRACT

The present invention provides a 3D wireless optical positioning method and system, including the steps of: arranging two LED lamps on the ceiling to transmit optical information and provide illumination; arranging a receiver including two photodetectors in a receiving plane; calculating the distance between the LED lamps and the photodetectors respectively through the TOA (Time of Arrival) method; and finally determining the actual position and orientation angle of the receiver based on the geometrical relationship between the LED lamps and the photodetectors in the XYZ coordinate system, the two photodetectors having a distance determined as l therebetween and being situated in the same receiving plane, the receiver being situated below the two LED lamps, the range where the receiver is to be positioned being on any side of the plane consisting of the two LED lamps and the origin.

10 Claims, 3 Drawing Sheets

(56) References Cited

FOREIGN PATENT DOCUMENTS

| CN | 111352070 A | | 6/2020 | |
|----|-------------|---|---------|---------|
| CN | 111736113 A | * | 10/2020 | G01S 5/16 |
| CN | 111751785 A | | 10/2020 | |
| CN | 112748399 A | | 5/2021 | |

OTHER PUBLICATIONS

Xiaodi You et al., "Indoor Three-Dimensional Optical Wireless Positioning and Orienteering Using Steerable Line Lasers" 2020 Asia Communications and Photonics Conference (ACP) and International Conference on Information Photonics and Optical Communications (IPOC) (Oct. 27, 2020).

Weipeng Guan et al., "A Novel Three-dimensional Indoor Localization Algorithm Based on Visual Visible Light Communication Using Single LED" 2018 IEEE International Conference on Automation, Electronics and Electrical Engineering (AUTEEE) (Nov. 18, 2018).

* cited by examiner

3D WIRELESS OPTICAL POSITIONING METHOD AND SYSTEM

This application is the National Stage Application of PCT/CN2021/116639, filed on Sep. 6, 2021, which claims priority to Patent Application No. 202111016290.5, filed on Aug. 31, 2021, which is incorporated by reference for all purposes as if fully set forth herein.

FIELD OF THE INVENTION

The present invention is related to the technical field of positioning, and more particularly to a 3D wireless optical positioning method and system.

DESCRIPTION OF THE RELATED ART

Positioning demand is present everywhere in life. Traditional outdoor positioning techniques, such as Beidou and GPS, have meter-level positioning accuracy outdoors, but their signals will be severely attenuated when they pass through walls and other obstructions, so Beidou and GPS are not suitable for indoor positioning that requires high accuracy. In recent years, as an alternative to GPS, many new indoor positioning techniques, such as ultrasonic, Bluetooth, WiFi, visible light positioning and so on, have been continuously developed. Because of its advantages of energy saving, high accuracy, fast positioning speed, strong anti-interference and low cost, visible light positioning stands out among many indoor positioning techniques. However, due to the limitation of its positioning principle, there is still great room for improvement in 3D positioning and orientation, which limits the large-scale use of visible light positioning to a certain extent.

The common visible light positioning solutions have the following problems: in use of the scenario analysis method, the characteristic parameters of the environment where the LED light source is located need to be measured first. If the space of the area to be measured is large, the parameter measurement process requires a great amount of work. Secondly, when the environment changes, the parameters need to be re-determined, and the portability of scenario analysis method is poor.

In the traditional geometric measurement method, at least three LED light sources are needed in order to realize trilateration or triangulation, which limits the use of positioning solutions in scenarios with insufficient number of LEDs. In addition, with this method, it is difficult to determine the orientation of the receiving terminal because there is only one photoelectric detector at the receiving terminal.

In the image sensor method, because it deals with the change in projection of the light source in the image sensor, the 3D spatial information becomes the 2D plane information, and the image sensor method cannot directly calculate the height of the receiving terminal, but can only realize 2D positioning.

Therefore, current indoor visible light positioning methods are mainly intended for indoor 2D positioning, which makes it difficult to achieve accurate indoor 3D positioning, and also makes it difficult to determine the actual orientation of the receiving terminal.

SUMMARY OF THE INVENTION

It is an object of the present invention to provide a 3D wireless optical positioning method and system that enables 3D positioning and orientation of a terminal while providing illumination and enables accurate indoor 3D positioning and accurate determination of the actual orientation of the terminal even in the case of a reduced number of optical transmitters.

To address the technical problem mentioned above, the present invention provides a 3D wireless optical positioning method including the steps of:

arranging LED lamps on the ceiling to transmit optical information and providing illumination and arranging a receiver on a receiving plane to receive the optical information, in which the LED lamps include a first LED lamp and a second LED lamp with a coordinate of $(x_{t1}, y_{t1}, z_{t1})$ and $(x_{t2}, y_{t2}, z_{t2})$ respectively, a first photodetector and a second photodetector with a coordinate of $(\hat{x}_{r1}, \hat{y}_{r1}, \hat{z}_{r1})$ and $(\hat{x}_{r2}, \hat{y}_{r2}, \hat{z}_{r2})$ respectively are arranged on the receiver, the distance between the first photodetector and the second photodetector is defined as l, meanwhile the first photodetector and the second photodetector both face upwards on the receiving plane, the middle point between the first photodetector and the second photodetector defines the actual position of the receiving terminal to be predicted, and the direction from the first photodetector to the second photodetector defines the orientation of the receiving terminal, that is, the included angle between the line interconnecting the first photodetector and the second photodetector and the positive half of the X axis is the orientation angle η;

through the TOA (Time of Arrival) principle, measuring the time required for the optical signal to be transmitted from the first LED lamp and the second LED lamp to and received by the first photodetector and the second photodetector respectively, and multiplying the propagation time by the speed of light to calculate the distance $d_1$ between the first LED lamp and the first photodetector, the distance $d_2$ between the second LED lamp and the first photodetector, the distance $d_3$ between the first LED lamp and the second photodetector and the distance $d_4$ between the second LED lamp and the second photodetector; and obtaining the actual position and orientation angle of the receiver based on the geometrical relationship between the LED lamps and the receiver in the XYZ coordinate system, the first photodetector and the second photodetector having a distance determined as l therebetween and being situated in the same receiving plane, the receiver being situated below the first LED lamp and the second LED lamp, the range where the receiver is to be positioned being on any side of the plane consisting of the first LED lamp, the second LED lamp and the origin.

As a further improvement of the present invention, the corresponding photodetector and LED lamp are in time synchronization in calculating the distances $d_1$-$d_4$.

As a further improvement of the present invention, the following equation set can be obtained for the distances $d_1$-$d_4$ in the XYZ coordinate system:

$$d_1^2 = (\hat{x}_{r1}-x_{t1})^2 + (\hat{y}_{r1}-y_{t1})^2 + (\hat{z}_{r1}-z_{t1})^2 \quad (1)$$

$$d_2^2 = (\hat{x}_{r1}-x_{t2})^2 + (\hat{y}_{r1}-y_{t2})^2 + (\hat{z}_{r1}-z_{t2})^2 \quad (2)$$

$$d_3^2 = (\hat{x}_{r2}-x_{t1})^2 + (\hat{y}_{r2}-y_{t1})^2 + (\hat{z}_{r2}-z_{t1})^2 \quad (3)$$

$$d_4^2 = (\hat{x}_{r2}-x_{t2})^2 + (\hat{y}_{r2}-y_{t2})^2 + (\hat{z}_{r2}-z_{t2})^2 \quad (4)$$

Meanwhile, the following supplementary equations can be obtained as the first photodetector and the second photodetector have a distance determined as l therebetween and are situated in the same receiving plane:

$$l^2 = (\hat{x}_{r2} - \hat{x}_{r1})^2 + (\hat{y}_{r2} - \hat{y}_{r1})^2 + (\hat{z}_{r2} - \hat{z}_{r1})^2 \quad (5)$$

$$\hat{z}_{r2} = \hat{z}_{r1} \quad (6)$$

Given the known $d_1$, $d_2$, $d_3$ and $d_4$ and the formulas (5) and (6) and in combination with the fact that the receiver is situated below the first LED lamp and the second LED lamp and the range where the receiver is to be positioned is on any side of the plane consisting of the first LED lamp, the second LED lamp and the origin, the actual position of the receiver $((\hat{x}_{r1}+\hat{x}_{r2})/2, (\hat{y}_{r1}+\hat{y}_{r2})/2, (\hat{z}_{r1}+\hat{z}_{r2})/2)$ and the orientation angle of the receiver can be obtained through solution of:

$$\hat{\eta} = \text{sign}(\hat{y}_{r2} - \hat{y}_{r1}) \arccos\left[\frac{(\hat{x}_{r2} - \hat{x}_{r1})}{\sqrt{(\hat{x}_{r1} - \hat{x}_{r2})^2 + (\hat{y}_{r1} - \hat{y}_{r2})^2}}\right] \quad (13)$$

As a further improvement of the present invention, the process of solving the actual position of the receiver $((\hat{x}_{r1}+\hat{x}_{r2})/2, (\hat{y}_{r1}+\hat{y}_{r2})/2, (\hat{z}_{r1}+\hat{z}_{r2})/2)$ and the orientation angle of the receiver specifically includes the following steps:

S1: as the formulas (1) and (2) each represent on the physical sense a sphere, subtracting the formula (2) from the formula (1) to obtain the equation for the plane P1 where the two spheres intersect each other, the first photodetector being positioned on the circle where this plane intersects the sphere represented by the formula (1), this circle having the centre at $K_1$, the coordinate of which being $(a_1, b_1, c_1)$, and the radius of $R_1$; and likewise, subtracting the formula (4) from the formula (3) to obtain the equation for the plane P2 where the two spheres intersect each other, the second photodetector being positioned on the circle where this plane intersects the sphere represented by the formula (3), this circle having the centre at $K_2$, the coordinate of which being $(a_2, b_2, c_2)$, and the radius of $R_2$, the coordinate of the circle centre and the radius of the circle being represented by the formulas:

$$K_i(a_i,b_i,c_i) = (x_{t1} + (x_{t2}-x_{t1})w_i/L, y_{t1}+(y_{t2}-y_{t1})w_i/L, z_{t1}+(z_{t2}-z_{t1})w_i/L), i=1,2 \quad (7)$$

$$R_1 = \sqrt{d_1^2 - w_1^2}$$

$$R_2 = \sqrt{d_3^2 - w_2^2} \quad (8)$$

where $w_i$ represents the distance between the first LED lamp and the plane $P_i$ (i=1, 2) where the two spheres intersect each other and L represents the distance between the first LED and the second LED lamp;

S2: performing two coordinate system transformations, where in the first coordinate transformation, an XYZ coordinate system is transformed into an X'Y'Z' coordinate system, the X'Y'Z' coordinate system having the circle centre $K_1$ as its origin of coordinate, the straight line $K_1 K_2$ as the new Z' axis, the intersecting line of the circle $K_1$ and the original XY plane as the new X' axis; and in the second coordinate transformation, the new X'Y'Z' coordinate system is transformed into a cylindrical coordinate system, whereupon after the two coordinate transformations, the coordinates of the first photodetector and the second photodetector are changed into $(R_1, \Phi_1, 0)$ and $(R_2, \Phi_2, S)$ respectively, and meanwhile, in the cylindrical coordinate system, the formula (5) and the formula (6) are represented respectively as:

$$\Phi_1 - \Phi_2 = \pm \arccos M \quad (9)$$

$$\beta(R_2 \sin \Phi_2 - R_1 \sin \Phi_1) = -\gamma S \quad (10)$$

where $M = (R_1^2 + R_2^2 + S^2 - l^2)/(2R_1 R_2)$, the distance between the two circle centres $K_1$ and $K_2$ is expressed as $S = \sqrt{a^2+b^2+c^2}$, $\beta = -\sqrt{(a^2+b^2)}/S$, $\gamma = c/S$, $a = a_2 - a_1$, $b = b_2 - b_1$, $c = c_2 - c_1$;

S3: calculating $\Phi_1$ and $\Phi_2$ according to the formula (9) and the formula (10), then performing two inverse coordinate transformations to recover the coordinates of the first photodetector and the second photodetector in the XYZ coordinate system through the formulas (11) and (12), i.e.:

$$(\hat{x}_{r1}, \hat{y}_{r1}, \hat{z}_{r1})' = (e_x, e_y, e_z)(R_1 \cos \Phi_1, R_1 \sin \Phi_1, 0)' + (a_1, b_1, c_1)' \quad (11)$$

$$(\hat{x}_{r2}, \hat{y}_{r2}, \hat{z}_{r2})' = (e_x, e_y, e_z)(R_2 \cos \Phi_2, R_2 \sin \Phi_2, S)' + (a_2, b_2, c_2)' \quad (12)$$

where $e_x = (b/\sqrt{a^2+b^2}, -a/\sqrt{a^2+b^2}, 0)'$, $e_y = [ac/(S\sqrt{(a^2+b^2)}), bc/(S\sqrt{(a^2+b^2)}), -\sqrt{(a^2+b^2)}/S]'$, $e_z = (a/S, b/S, c/S)'$ are the orthogonal basis of the first coordinate transformation.

As a further improvement of the present invention, in the step S3, four sets of solution are obtained by solving $\Phi_1$ and $\Phi_2$, and accordingly, four sets of coordinates of the first photodetector and the second photodetector in the XYZ coordinate system are obtained through two inverse coordinate transformations, whereas the actual position includes only one set, and as the four sets of solution are spatially symmetrical with respect to the line interconnecting the first LED lamp and the second LED lamp, the real solution can be obtained through determination based on the following conditions, including specifically the following steps:

S4: excluding two sets of solution representing a position above the first LED lamp and the second LED lamp considering the fact that the position of the receiver is below the first LED lamp and the second LED lamp;

S5: obtaining the single real solution out of the remaining two sets of solution by restricting the receiver in movement on any side of the plane consisting of the first LED lamp, the second LED lamp and the origin;

S6: obtaining the coordinate of the receiver as $((\hat{x}_{r1}+\hat{x}_{r2})/2, (\hat{y}_{r1}+\hat{y}_{r2})/2, (\hat{z}_{r1}+\hat{z}_{r2})/2)$ through the single set of solution, in which the orientation angle $\eta$ of the receiver has a value expressed by the formula (13) as:

$$\hat{\eta} = \text{sign}(\hat{y}_{r2} - \hat{y}_{r1}) \arccos\left[\frac{(\hat{x}_{r2} - \hat{x}_{r2})}{\sqrt{(\hat{x}_{r1} - \hat{x}_{r2})^2 + (\hat{y}_{r1} - \hat{y}_{r2})^2}}\right] \quad (13)$$

where sign is the sign function.

As a further improvement of the present invention, the number of the LED lamps is defined depending on the region where they are to be positioned.

A 3D wireless optical positioning systems includes:

LED lamps including a first LED lamp and a second LED lamp with a coordinate of $(x_{t1}, y_{t1}, z_{t1})$ and $(x_{t2}, y_{t2}, z_{t2})$ respectively, arranged on the ceiling to transmit optical information and provide illumination;

a receiver provided with a first photodetector and a second photodetector with a coordinate of $(\hat{x}_{r1}, \hat{y}_{r1}, \hat{z}_{r1})$ and $(\hat{x}_{r2}, \hat{y}_{r2}, \hat{z}_{r2})$ respectively, arranged on a receiving plane to receive the optical information;

in which the distance between the first photodetector and the second photodetector is defined as l, meanwhile the first photodetector and the second photodetector both face upwards on the receiving plane, the middle point between the first photodetector and the second photodetector defines the actual position of the receiving terminal to be predicted, and the direction from the first photodetector to the second photodetector defines the orientation of the receiving terminal, that is, the included angle between the line interconnecting the first photodetector and the second photodetector and the positive half of the X axis is the orientation angle η;

through the TOA (Time of Arrival) principle, the time required for the optical signal to be transmitted from the first LED lamp and the second LED lamp to and received by the first photodetector and the second photodetector respectively is measured, and the propagation time is multiplied by the speed of light to calculate the distance $d_1$ between the first LED lamp and the first photodetector, the distance $d_2$ between the second LED lamp and the first photodetector, the distance $d_3$ between the first LED lamp and the second photodetector and the distance $d_4$ between the second LED lamp and the second photodetector; and the actual position and orientation angle of the receiver are obtained based on the geometrical relationship between the LED lamps and the receiver in the XYZ coordinate system, the first photodetector and the second photodetector having a distance determined as l therebetween and being situated in the same receiving plane, the receiver being situated below the first LED lamp and the second LED lamp, the range where the receiver is to be positioned being on any side of the plane consisting of the first LED lamp, the second LED lamp and the origin.

As a further improvement of the present invention, the first LED lamp and the second LED lamp and the first photodetector and the second photodetector have synchronized operation time.

As a further improvement of the present invention, the following set of equations for the distances $d_1$ to $d_4$ in the XYZ coordinate system is obtained based on the geometrical relationship between the LED lamps and the receiver in the XYZ coordinate system:

$$d_1^2 = (\hat{x}_{r1} - x_{t1})^2 + (\hat{y}_{r1} - y_{t1})^2 + (\hat{z}_{r1} - z_{t1})^2 \quad (1)$$

$$d_2^2 = (\hat{x}_{r1} - x_{t2})^2 + (\hat{y}_{r1} - y_{t2})^2 + (\hat{z}_{r1} - z_{t2})^2 \quad (2)$$

$$d_3^2 = (\hat{x}_{r2} - x_{t1})^2 + (\hat{y}_{r2} - y_{t1})^2 + (\hat{z}_{r2} - z_{t1})^2 \quad (3)$$

$$d_4^2 = (\hat{x}_{r2} - x_{t2})^2 + (\hat{y}_{r2} - y_{t2})^2 + (\hat{z}_{r2} - z_{t2})^2 \quad (4)$$

Meanwhile, the following supplementary equations can be obtained as the first photodetector and the second photodetector have a distance determined as l therebetween and are situated in the same receiving plane:

$$l^2 = (\hat{x}_{r2} - \hat{x}_{r1})^2 + (\hat{y}_{r2} - \hat{y}_{r1})^2 + (\hat{z}_{r2} - \hat{z}_{r1})^2 \quad (5)$$

$$\hat{z}_{r2} = \hat{z}_{r1} \quad (6)$$

Given the known $d_1$, $d_2$, $d_3$ and $d_4$ and the formulas (5) and (6) and in combination with the fact that the receiver is situated below the first LED lamp and the second LED lamp and the range where the receiver is to be positioned is on any side of the plane consisting of the first LED lamp, the second LED lamp and the origin, the actual position of the receiver $((\hat{x}_{r1}+\hat{x}_{r2})/2, (\hat{y}_{r1}+\hat{y}_{r2})/2, (\hat{z}_{r1}+\hat{z}_{r2})/2)$ and the orientation angle of the receiver can be obtained through solution of:

$$\hat{\eta} = \text{sign}(\hat{y}_{r2} - \hat{y}_{r1}) \arccos \left[ \frac{(\hat{x}_{r2} - \hat{x}_{r1})}{\sqrt{(\hat{x}_{r1} - \hat{x}_{r2})^2 + (\hat{y}_{r1} - \hat{y}_{r2})^2}} \right]. \quad (13)$$

As a further improvement of the present invention, the first LED lamp, the second LED lamp, the first photodetector and the second photodetector are provided with a time synchronization device.

The present invention has the following beneficial effects. In the present invention, a small number of optical transmitters is utilized and LED lamps are used as the light source, so that the deployment is simpler, the portability is better and the limitation is reduced. The present positioning method can be applied to various indoor scenarios to achieve accurate indoor 3D positioning without the need for additional devices, such as image sensors, and by use of the pair of photodetectors, the actual orientation of the terminal can be accurately determined. For the scenario of a row of lamps indoors, the method of the present invention is particularly applicable by positioning on one side of the lamps. That is, the present method has good extensibility and good portability, and can be stably used in various indoor scenarios.

DETAILED DESCRIPTION OF THE PREFERRED EMBODIMENTS

The invention will be further explained with reference to the following drawings and particular embodiments, so that those skilled in the art can better understand and implement the present invention. However, the listed embodiments should not be taken as limitation of the present invention.

Figure 1:
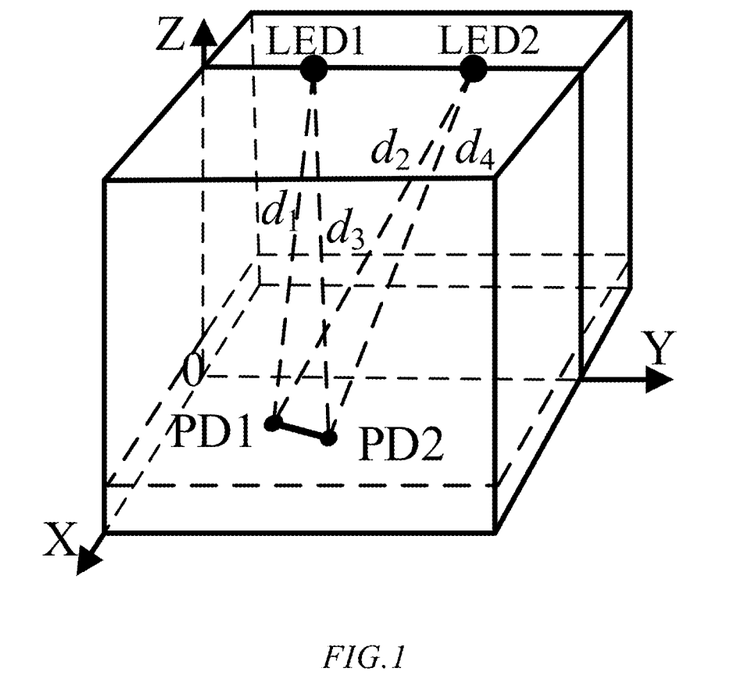
FIG. 1 is a schematic structural view of a system according to the present invention.
Figure 2:
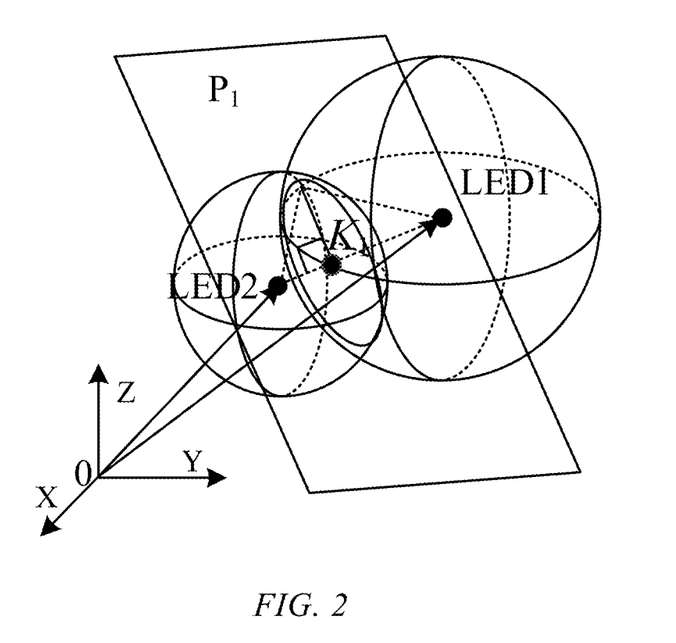
FIG. 2 is a schematic view showing intersection of two spheres in the step S1 according to the present invention.
Figure 3:
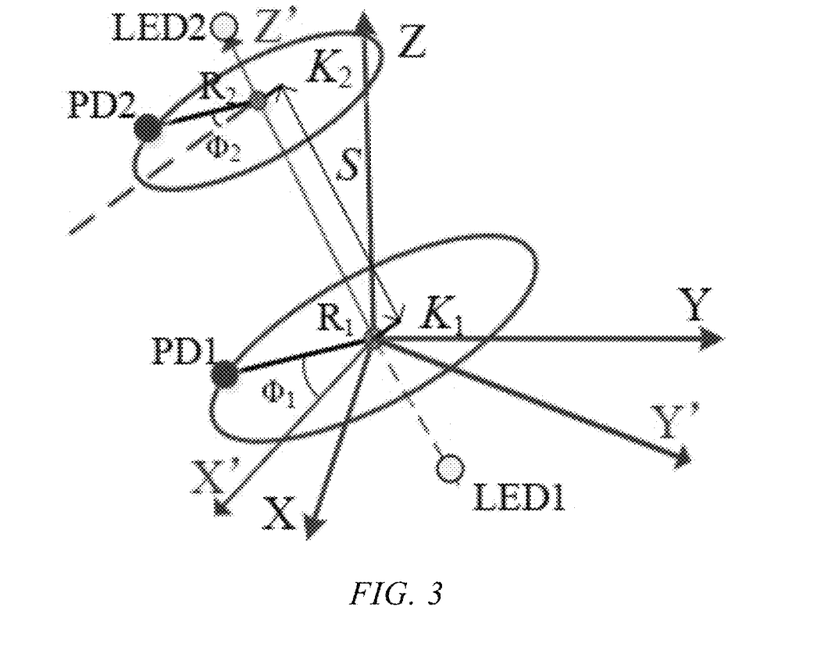
FIG. 3 is a schematic view showing coordinate transformations in the step S2 according to the present invention.

Referring to FIGS. 1-3, an embodiment of the present invention provides a 3D wireless optical positioning method, including the following steps:

arranging LED lamps on the ceiling to transmit optical information and providing illumination and arranging a receiver on a receiving plane to receive the optical information, in which the LED lamps include a first LED lamp and a second LED lamp with a coordinate of $(x_{t1}, y_{t1}, z_{t1})$ and $(x_{t2}, y_{t2}, z_{t2})$ respectively, a first photodetector and a second photodetector with a coordinate of $(\hat{x}_{r1}, \hat{y}_{r1}, \hat{z}_{r1})$ and $(\hat{x}_{r2}, \hat{y}_{r2}, \hat{z}_{r2})$ respectively are arranged on the receiver, the distance between the first photodetector and the second photodetector is defined as l, meanwhile the first photodetector and the second photodetector both face upwards on the receiving plane, the middle point between the first photodetector and the second photodetector defines the actual position of the receiving terminal to be predicted, and the direction from the first photodetector to the second photodetector defines the orientation of the receiving terminal, that is, the included angle between the line interconnecting the first photodetector and the second photodetector and the positive half of the X axis is the orientation angle η;

through the TOA (Time of Arrival) principle, measuring the time required for the optical signal to be transmitted from the first LED lamp and the second LED lamp to and received by the first photodetector and the second photodetector respectively, and multiplying the propagation time by the speed of light to calculate the distance $d_1$ between the first LED lamp and the first photodetector, the distance $d_2$ between the second LED lamp and the first photodetector, the distance $d_3$ between the first LED lamp and the second photodetector and the distance $d_4$ between the second LED lamp and the second photodetector respectively; and obtaining the actual position and orientation angle of the receiver based on the geometrical relationship between the LED lamps and the receiver in the XYZ coordinate system, the first photodetector and the second photodetector having a distance determined as l therebetween and being situated in the same receiving plane, the receiver being situated below the first LED lamp and the second LED lamp, the range where the receiver is to be positioned being on any side of the plane consisting of the first LED lamp, the second LED lamp and the origin.

Specifically, it is proposed that the system consists of two elements as a transmitter and a receiver. The transmitter includes two LED lamps installed on the ceiling, LED1 and LED2, with a coordinate of $(x_{t1}, y_{t1}, z_{t1})$ and $(x_{t2}, y_{t2}, z_{t2})$ respectively, that can provide illumination. The plane where the receiver is situated is the receiving plane. A pair of (two) photodetectors is installed on the receiver. The two photodetectors are PD1 and PD2 respectively, with a coordinate of $(\hat{x}_{r1}, \hat{y}_{r1}, \hat{z}_{r1})$ and $(\hat{x}_{r2}, \hat{y}_{r2}, \hat{z}_{r2})$ respectively, configured to receive the optical information transmitted from the light source. The distance between PD1 and PD2 is l, and PD1 and PD2 both face upwards. The middle point between PD1 and PD2 defines the actual position of the receiving terminal to be predicted. The direction from PD1 to PD2 defines the orientation of the receiving terminal. The included angle between the line interconnecting PD1 and PD2 and the positive half of the X axis is defined as the orientation angle η.

Positioning: through the TOA (Time of Arrival) principle, the time required for the optical signal to be transmitted from LED1 and LED2 to and received by PD1 and PD2 respectively is measured, and the propagation time is multiplied by the speed of light to calculate the distance $d_1$ between LED1 and PD1, the distance $d_2$ between LED2 and PD1, the distance $d_3$ between LED1 and PD2 and the distance $d_4$ between LED2 and PD2. The following set of equations is obtained:

$$d_1^2 = (\hat{x}_{r1} - x_{t1})^2 + (\hat{y}_{r1} - y_{t1})^2 + (\hat{z}_{r1} - z_{t1})^2 \tag{1}$$

$$d_2^2 = (\hat{x}_{r1} - x_{t2})^2 + (\hat{y}_{r1} - y_{t2})^2 + (\hat{z}_{r1} - z_{t2})^2 \tag{2}$$

$$d_3^2 = (\hat{x}_{r2} - x_{t1})^2 + (\hat{y}_{r2} - y_{t1})^2 + (\hat{z}_{r2} - z_{t1})^2 \tag{3}$$

$$d_4^2 = (\hat{x}_{r2} - x_{t2})^2 + (\hat{y}_{r2} - y_{t2})^2 + (\hat{z}_{r2} - z_{t2})^2 \tag{4}$$

Meanwhile, the following supplementary equations can be obtained as PD1 and PD2 have a distance determined as l therebetween and are situated in the same receiving plane:

$$l^2 = (\hat{x}_{r2} - \hat{x}_{r1})^2 + (\hat{y}_{r2} - \hat{y}_{r1})^2 + (\hat{z}_{r2} - \hat{z}_{r1})^2 \tag{5}$$

$$\hat{z}_{r2} = \hat{z}_{r1} \tag{6}$$

The equation set including formulas (1)-(6) is solved by the following steps:

First step: as shown in FIG. 2, as the formulas (1) and (2) each represent on the physical sense a sphere, the formula (2) is subtracted from the formula (1) to obtain the equation for the plane P1 where the two spheres intersect each other, PD1 being positioned on the circle where this plane intersects the sphere represented by the formula (1), this circle having the centre at $K_1$, the coordinate of which being $(a_1, b_1, c_1)$, and the radius of $R_1$; and likewise, the formula (4) is subtracted from the formula (3) to obtain the equation for the plane P2 where the two spheres intersect each other, PD2 being positioned on the circle where this plane intersects the sphere represented by the formula (3), this circle having the centre at $K_2$, the coordinate of which being $(a_2, b_2, c_2)$ and the radius of $R_2$, the coordinate of the circle centre and the radius of the circle being represented by the formulas:

$$K_i(a_i, b_i, c_i) = (x_{t1} + (x_{t2} - x_{t1})w_i/L, y_{t1} + (y_{t2} - y_{t1})w_i/L, z_{t1} + (z_{t2} - z_{t1})w_i/L), i=1,2 \tag{7}$$

$$R_1 = \sqrt{d_1^2 - w_1^2}$$

$$R_2 = \sqrt{d_3^2 - w_2^2} \tag{8}$$

where $w_i$ represents the distance between LED1 and the plane $P_i$ (i=1, 2) where the two spheres intersect each other and L represents the distance between LED1 and LED2.

Second step: as shown in FIG. 3, two coordinate transformations are performed, where in the first coordinate transformation, an XYZ coordinate system is transformed into an X'Y'Z' coordinate system, the X'Y'Z' coordinate system having the circle centre $K_1$ as its origin of coordinate, the straight line $K_1 K_2$ as the new Z' axis, the intersecting line of the circle $K_1$ and the original XY plane as the new X' axis; and in the second coordinate transformation, the new X'Y'Z' coordinate system is transformed into a cylindrical coordinate system, whereupon after the two coordinate transformations, the coordinates of PD1 and PD2 are changed into $(R_1, \Phi_1, 0)$ and $(R_2, \Phi_2, S)$ respectively, and meanwhile, in the cylindrical coordinate system, the formulas (5) and (6) are represented respectively as:

$$\Phi_1 - \Phi_2 = \pm \arccos M \tag{9}$$

$$\beta(R_2 \sin \Phi_2 - R_1 \sin \Phi_1) = -\gamma S \tag{10}$$

where $M = (R_1^2 + R_2^2 + S^2 - l^2)/(2R_1 R_2)$, the distance between the two circle centres $K_1$ and $K_2$ is expressed as $S = \sqrt{a^2 + b^2 + c^2}$, $\beta = -\sqrt{(a^2 + b^2)}/S$, $\gamma = c/S$, $a = a_2 - a_1$, $b = b_2 - b_1$, $c = c_2 - c_1$.

Third step: $\Phi_1$ and $\Phi_2$ are calculated according to the set of equations (9) and (10), then two inverse coordinate transformations are performed to recover the coordinates of PD1 and PD2 in the XYZ coordinate system through the formulas (11) and (12).

$$(\hat{x}_{r1}, \hat{y}_{r1}, \hat{z}_{r1})' = (e_x, e_y, e_z)(R_1 \cos \Phi_1, R_1 \sin \Phi_1, 0)' + (a_1, b_1, c_1)' \tag{11}$$

$$(\hat{x}_{r2}, \hat{y}_{r2}, \hat{z}_{r2})' = (e_x, e_y, e_z)(R_2 \cos \Phi_2, R_2 \sin \Phi_2, S)' + (a_2, b_2, c_2)' \tag{12}$$

where
$e_x = (b/\sqrt{a^2+b^2}, -a/\sqrt{a^2+b^2}, 0)'$, $e_y = [ac/(S\sqrt{(a^2+b^2)}), bc/(S\sqrt{(a^2+b^2)}), -\sqrt{(a^2+b^2)}/S]'$, $e_z = (a/S, b/S, c/S)'$ are the orthogonal basis of the first coordinate transformation.

Fourth step: in the step S3, four sets of solution are obtained by solving $\Phi_1$ and $\Phi_2$, and accordingly, four sets of coordinates of PD1 and PD2 in the XYZ coordinate system are obtained through two inverse coordinate transformations, whereas the actual position includes only one set. As the four sets of solution are spatially symmetrical with respect to the line interconnecting LED1 and LED2, the real solution can be obtained through determination based on the following conditions, including specifically the following steps:

excluding two sets of solution representing a position above LED1 and LED2 considering the fact that the position of the receiver is definitely below LED1 and LED2 in practical applications; and obtaining the single real solution out of the remaining two sets of solution by restricting the receiver in movement only on any side of the plane consisting of LED1, LED2 and the origin.

the coordinates of the receiver as $((\hat{x}_{r1}+\hat{x}_{r2})/2, (\hat{y}_{r1}+\hat{y}_{r2})/2, (\hat{z}_{r1}+\hat{z}_{r2})/2)$ are obtained through the single set of solution, in which the orientation angle $\eta$ of the receiver has a value expressed by the formula (13) as:

$$\hat{\eta} = \text{sign}(\hat{y}_{r2} - \hat{y}_{r1}) \arccos\left[\frac{(\hat{x}_{r2} - \hat{x}_{r1})}{\sqrt{(\hat{x}_{r1} - \hat{x}_{r2})^2 + (\hat{y}_{r1} - \hat{y}_{r2})^2}}\right] \quad (13)$$

where sign is the sign function.

It is noted that, in the present invention, the range where the terminal is to be positioned is on any side of the plane consisting of LED1, LED2 and the origin.

According to the present invention, accurate 3D positioning and orientation of the terminal can be achieved. Only two LED lamps are used at the transmitting terminal to enable 3D positioning and orientation while providing illumination. A pair of (2 in total) photodetectors is installed on the terminal to receive signals. These two photodetectors are positioned at the same level in the same receiving plane and have a constant and known distance therebetween. According to the present invention, through the TOA (Time of Arrival) principle, the time required for the optical signal to be transmitted from LED1 and LED2 to and received by PD1 and PD2 respectively is measured and the propagation time is multiplied by the speed of light to calculate the distance $d_1$ between LED1 and PD1, the distance $d_2$ between LED2 and PD1, the distance $d_3$ between LED1 and PD2 and the distance $d_4$ between LED2 and PD2. Positioning is achieved by the calculation steps in the formulas (1) to (13) described above based on the geometrical relationship between the transmitter and the receiver.

The present invention further provides a 3D wireless optical positioning system, including:

LED lamps including a first LED lamp and a second LED lamp with a coordinate of $(x_{t1}, y_{t1}, z_{t1})$ and $(x_{t2}, y_{t2}, z_{t2})$ respectively, arranged on the ceiling to transmit optical information and provide illumination;

a receiver provided with a first photodetector and a second photodetector with a coordinate of $(\hat{x}_{r1}, \hat{y}_{r1}, \hat{z}_{r1})$ and $(\hat{x}_{r2}, \hat{y}_{r2}, \hat{z}_{r2})$ respectively, arranged on a receiving plane to receive the optical information;

in which the distance between the first photodetector and the second photodetector is defined as l, meanwhile the first photodetector and the second photodetector both face upwards on the receiving plane, the middle point between the first photodetector and the second photodetector defines the actual position of the receiving terminal to be predicted, and the direction from the first photodetector to the second photodetector defines the orientation of the receiving terminal, that is, the included angle between the line interconnecting the first photodetector and the second photodetector and the positive half of the X axis is the orientation angle $\eta$;

through the TOA (Time of Arrival) principle, the time required for the optical signal to be transmitted from the first LED lamp and the second LED lamp to and received by the first photodetector and the second photodetector respectively is measured, and the propagation time is multiplied by the speed of light to calculate the distance $d_1$ between the first LED lamp and the first photodetector, the distance $d_2$ between the second LED lamp and the first photodetector, the distance $d_3$ between the first LED lamp and the second photodetector and the distance $d_4$ between the second LED lamp and the second photodetector; and the actual position and orientation angle of the receiver are obtained based on the geometrical relationship between the LED lamps and the receiver in the XYZ coordinate system, the first photodetector and the second photodetector having a distance determined as l therebetween and being situated in the same receiving plane, the range where the receiver is to be positioned being restricted to be on any side of the plane consisting of the first LED lamp, the second LED lamp and the origin and the range of the receiver being restricted to be below the first LED lamp and the second LED lamp.

Embodiment

Figure 4:
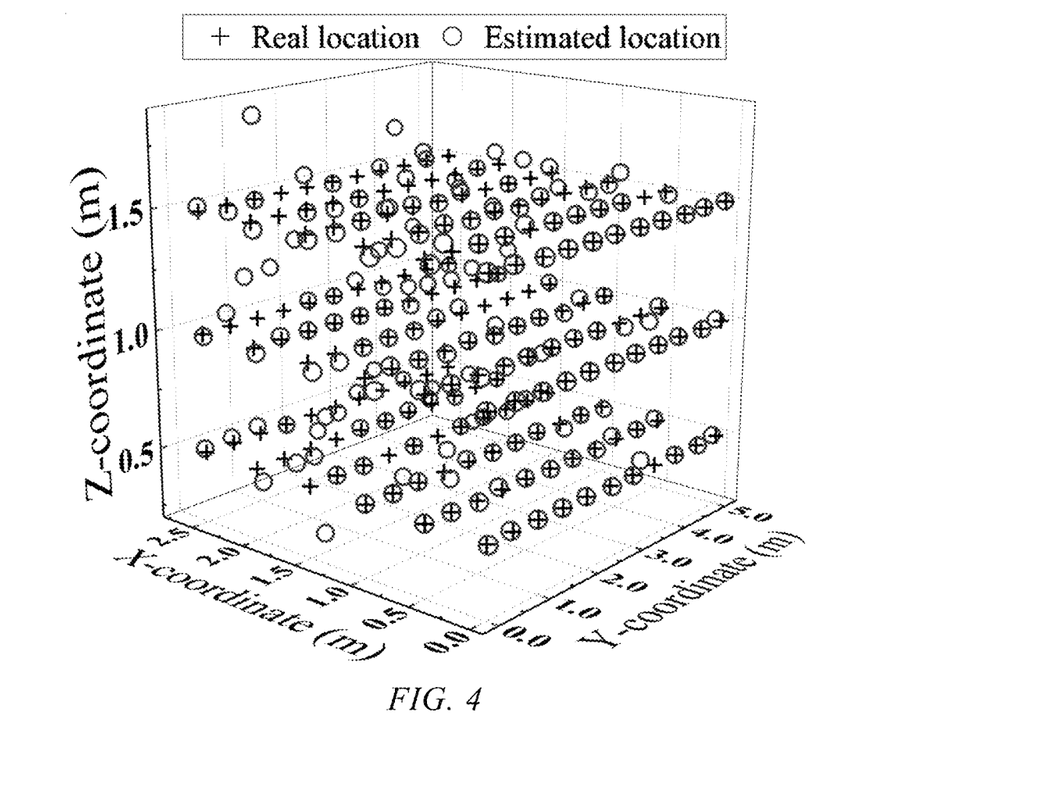
FIG. 4 is a schematic view of 3D positioning results according to an embodiment of the present invention.

To evaluate the performance of the proposed 3D wireless optical positioning method and system, a specific indoor space scenario of a size of 3 m×5 m×3 m (length×width×height) is considered for positioning. The LED lamps are deployed on the ceiling. LED1 has a coordinate of (0, 1.5, 3) and LED2 has a coordinate of (0, 3.5, 3). The distance between the transmitting terminal and the receiving terminal is estimated by using the TOA method. Assuming that a random error $\Delta d$ is present in distance estimation for $d_1$, $d_2$, $d_3$ and $d_4$ measured through TOA, and the individual random errors are independent and subject to normal distribution. The mobile terminal is positioned on the receiving plane and has a orientation angle (orientation) that is randomly distributed. Tests are conducted at various positions at an interval of 0.5 m, as shown by the cross line in FIG. 4. A photodetector PD1 and a photodetector PD2 are installed on the terminal and have a constant distance l therebetween of 0.2 m, and the estimation error $\Delta d$ has a standard deviation of 0.025 m. As can be seen from the drawings, after the 3D positioning and orientation solution propose by the present invention is adopted, when the receiving plane is at a level of 0.5 m, the 3D positioning error is 9.5 cm and the orientation error is 10.2°; when the receiving plane is at a level of 1 m, the 3D positioning error is 9.1 cm and the orientation error is 7.8°; when the receiving plane is at a level of 1.5 m, the 3D positioning error is 9.0 cm and the orientation error is 10.4°; and three planes at different levels have an overall average 3D positioning error of 9.2 cm and an overall terminal orientation angle error of 9.5°.

Figure 5:
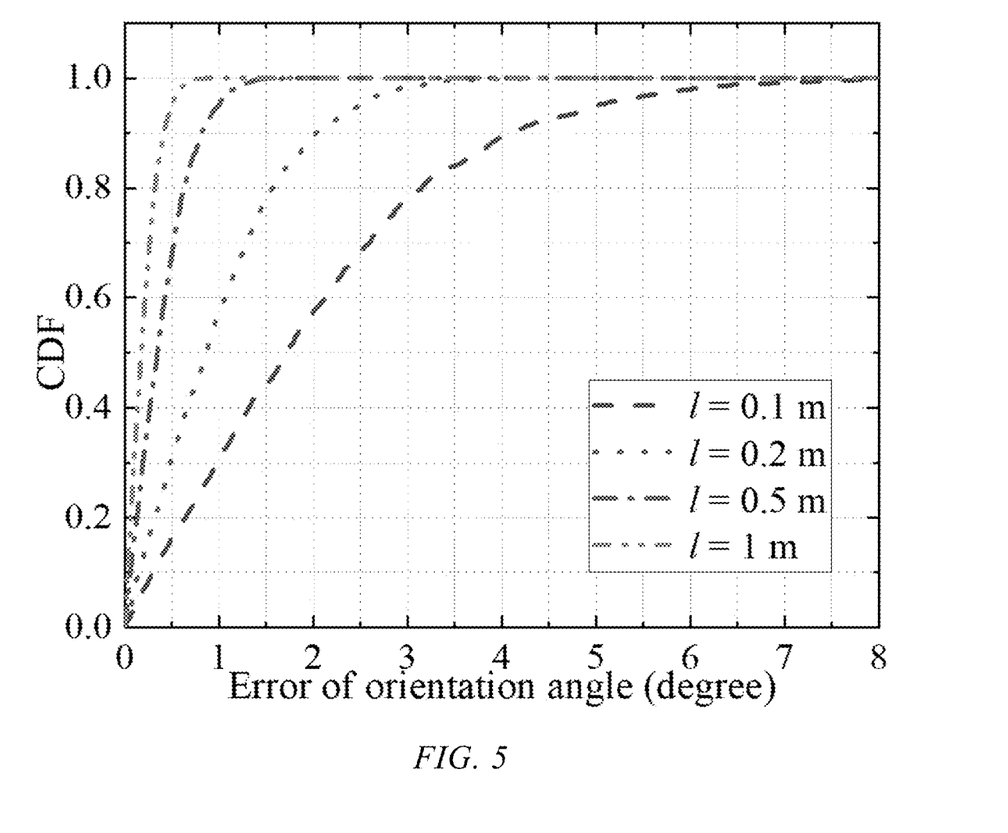
FIG. 5 is the diagram of an accumulated distribution function of the estimation error for the orientation angle according to an embodiment of the present invention.

FIG. 5 is the diagram of an accumulated distribution function (CDF) of the estimation error for the orientation angle η as the distance 1 between the photodetector PD1 and the photodetector PD2 changes. The level of the receiving plane is at 1 m, the light source 1 is positioned at (0, 1.5, 3) and the light source 2 is positioned at (0, 3.5, 3), and the standard deviation of Δd is 0.025 m. According to the statistical results, when l is 0.1 m, 0.2 m, 0.5 m and 1 m, there are 90% orientation angle errors that are less than 4.1°, 2.0°, 0.8° and 0.4° respectively. These results prove the feasibility and reliability of the proposed method.

The embodiments described above are only preferred embodiments listed for fully explaining the present invention, and the scope of protection of the present invention is not limited thereto. Equivalent substitutions or changes made by those skilled in the art on the basis of the present invention shall fall within the scope of protection of the present invention. The scope of protection of the present invention is defined by the claims.

What is claimed is:

1. A 3D wireless optical positioning method comprising steps of:
    arranging LED lamps on a ceiling to transmit optical information and providing illumination and arranging a receiver on a receiving plane to receive the optical information, wherein the LED lamps include a first LED lamp and a second LED lamp with a coordinate of $(x_{t1}, y_{t1}, z_{t1})$ and $(x_{t2}, y_{t2}, z_{t2})$ respectively, a first photodetector and a second photodetector with a coordinate of $\hat{x}_{r1}, \hat{y}_{r1}, \hat{z}_{r1}$ and $(\hat{x}_{r2}, \hat{y}_{r2}, \hat{z}_{r2})$ respectively are arranged on the receiver, a distance between the first photodetector and the second photodetector is defined as l, meanwhile the first photodetector and the second photodetector both face upwards on the receiving plane, a middle point between the first photodetector and the second photodetector defines an actual position of a receiving terminal to be predicted, and a direction from the first photodetector to the second photodetector defines an orientation of the receiving terminal, that is, an included angle between the line interconnecting the first photodetector and the second photodetector and the positive half of the X axis is a orientation angle η;
    through the Time of Arrival principle, measuring the time required for the optical signal to be transmitted from the first LED lamp and the second LED lamp to and received by the first photodetector and the second photodetector respectively, and multiplying the propagation time by the speed of light to calculate the distance $d_1$ between the first LED lamp and the first photodetector, the distance $d_2$ between the second LED lamp and the first photodetector, the distance $d_3$ between the first LED lamp and the second photodetector and the distance $d_4$ between the second LED lamp and the second photodetector; and
    obtaining the actual position and orientation angle of the receiver based on the geometrical relationship between the LED lamps and the receiver in the XYZ coordinate system, the first photodetector and the second photodetector having a distance determined as/therebetween and being situated in the same receiving plane, the receiver being situated below the first LED lamp and the second LED lamp, the range where the receiver is to be positioned being on any side of the plane consisting of the first LED lamp, the second LED lamp and the origin.

2. The 3D wireless optical positioning method of claim 1, wherein the corresponding photodetector and LED lamp are in time synchronization in calculating the distances $d_1$–$d_4$.

3. The 3D wireless optical positioning method of claim 1, wherein the following equation set is obtained for the distances $d_1$~$d_4$ in the XYZ coordinate system:

$$d_1^2=(\hat{x}_{r1}-x_{t1})^2+(\hat{y}_{r1}-y_{t1})^2+(\hat{z}_{r1}-z_{t1})^2 \quad (1)$$

$$d_2^2=(\hat{x}_{r1}-x_{t2})^2+(\hat{y}_{r1}-y_{t2})^2+(\hat{z}_{r1}-z_{t2})^2 \quad (2)$$

$$d_3^2=(\hat{x}_{r2}-x_{t1})^2+(\hat{y}_{r2}-y_{t1})^2+(\hat{z}_{r2}-z_{t1})^2 \quad (3)$$

$$d_4^2=(\hat{x}_{r2}-x_{t2})^2+(\hat{y}_{r2}-y_{t2})^2+(\hat{z}_{r2}-z_{t2})^2 \quad (4)$$

meanwhile, supplementary equations are obtained as the first photodetector and the second photodetector have a distance determined as/therebetween and are situated in the same receiving plane:

$$l^2=(\hat{x}_{r2}-\hat{x}_{r1})^2+(\hat{y}_{r2}-\hat{y}_{r1})^2+(\hat{z}_{r2}-\hat{z}_{r1})^2 \quad (5)$$

$$\hat{z}_{r2}=\hat{z}_{r1} \quad (6) \text{ and}$$

given the known $d_1$, $d_2$, $d_3$ and $d_4$ and the formulas (5) and (6) and in combination with the fact that the receiver is situated below the first LED lamp and the second LED lamp and the range where the receiver is to be positioned is on any side of the plane consisting of the first LED lamp, the second LED lamp and the origin, the actual position of the receiver $((\hat{x}_{r1}+\hat{x}_{r2})/2, (\hat{y}_{r1}+\hat{y}_{r2})/2, (\hat{z}_{r1}+\hat{z}_{r2})/2)$ and the orientation angle of the receiver are obtained through solution of:

$$\hat{\eta} = \text{sign}(\hat{y}_{r2} - \hat{y}_{r1})\arccos\left[\frac{(\hat{x}_{r2} - \hat{x}_{r1})}{\sqrt{(\hat{x}_{r1} - \hat{x}_{r2})^2 + (\hat{y}_{r1} - \hat{y}_{r2})^2}}\right]. \quad (13)$$

4. The 3D wireless optical positioning method of claim 3, wherein the process of solving the actual position of the receiver $((\hat{x}_{r1}+\hat{x}_{r2})/2, (\hat{y}_{r1}+\hat{y}_{r2})/2, (\hat{z}_{r1}+\hat{z}_{r2})/2)$ and the orientation angle of the receiver specifically comprises steps of:
    S1: as the formulas (1) and (2) each represent on the physical sense a sphere, subtracting the formula (2) from the formula (1) to obtain an equation for the plane P1 where the two spheres intersect each other, the first photodetector being positioned on a circle where this plane intersects the sphere represented by the formula (1), this circle having a centre at $K_1$, a coordinate of which being $(a_1, b_1, c_1)$, and a radius of $R_1$; and likewise, subtracting the formula (4) from the formula (3) to obtain the equation for the plane P2 where the two spheres intersect each other, the second photodetector being positioned on a circle where this plane intersects the sphere represented by the formula (3), this circle having a centre at $K_2$, a coordinate of which being $(a_2, b_2, c_2)$, and a radius of $R_2$, a coordinate of the circle centre and a radius of the circle being represented by the formulas:

$$K_i(a_i, b_i, c_i) = \left(x_{t1} + (x_{t2} - x_{t1})\frac{w_i}{L},\right. \quad (7)$$
$$\left. y_{t1} + (y_{t2} - y_{t1})\frac{w_i}{L}, z_{t1} + (z_{t2} - z_{t1})\frac{w_i}{L}\right), i = 1, 2 \ldots$$

-continued $$R_1 = \sqrt{d_1^2 - w_1^2} \qquad (8)$$

$$R_2 = \sqrt{d_3^2 - w_2^2}$$

where $w_i$ represents a distance between the first LED lamp and a plane $P_i$(i=1, 2) where the two spheres intersect each other and L represents a distance between the first LED and the second LED lamp;

S2: performing two coordinate system transformations, where in a first coordinate transformation, an XYZ coordinate system is transformed into an X'Y'Z' coordinate system, the X'Y'Z' coordinate system having a circle centre $K_1$ as its origin of coordinate, a straight line $K_1 K_2$ as a new Z' axis, an intersecting line of the circle $K_1$ and the original XY plane as a new X' axis; and in the second coordinate transformation, a new X'Y'Z' coordinate system is transformed into a cylindrical coordinate system, whereupon after the two coordinate transformations, the coordinates of the first photodetector and the second photodetector are changed into $(R_1, \Phi_1, 0)$ and $(R_2, \Phi_2, S)$ respectively, and meanwhile, in a cylindrical coordinate system, the formula (5) and the formula (6) are represented respectively as:

$$\Phi_1 - \Phi_2 = \pm \arccos M \qquad (9)$$

$$\beta(R_2 \sin \Phi_2 - R_1 \sin \Phi_1) = -\gamma S \qquad (10)$$

where $M=(R_1^2+R_2^2+S^2-l^2)/(2R_1R_2)$, the distance between the two circle centres $K_1$ and $K_2$ is expressed as $S=\sqrt{a^2+b^2+c^2}$, $\beta=-\sqrt{(a^2+b^2)}/S$, $\gamma=c/S$, $a=a_2-a_1$, $b=b_2-b_1$, $c=c_2-c_1$; and S3: calculating $\Phi_1$ and $\Phi_2$ according to the formula (9) and the formula (10), then performing two inverse coordinate transformations to recover the coordinates of the first photodetector and the second photodetector in the XYZ coordinate system through the formulas (11) and (12):

$$(\hat{x}_{r1}, \hat{y}_{r1}, \hat{z}_{r1})'=(e_x, e_y, e_z)(R_1 \cos \Phi_1, R_1 \sin \Phi_1, 0)'+(a_1, b_1, c_1)' \qquad (11)$$

$$(\hat{x}_{r2}, \hat{y}_{r2}, \hat{z}_{r2})'=(e_x, e_y, e_z)(R_2 \cos \Phi_2, R_2 \sin \Phi_2, S)'+(a_2, b_2, c_2)' \qquad (12)$$

where $e_x=(b/\sqrt{a^2+b^2}, -a/\sqrt{a^2+b^2}, 0)'$, $e_y=[ac/(S\sqrt{(a^2+b^2)}), bc/(S\sqrt{(a^2+b^2)}), -\sqrt{(a^2+b^2)}/S]'$, $e_z=(a/S, b/S, c/S)'$ are the orthogonal basis of the first coordinate transformation.

5. The 3D wireless optical positioning method of claim 4, wherein in the step S3, four sets of solution are obtained by solving $\Phi_1$ and $\Phi_2$, and accordingly, four sets of coordinates of the first photodetector and the second photodetector in the XYZ coordinate system are obtained through two inverse coordinate transformations, whereas the actual position includes only one set, and as the four sets of solution are spatially symmetrical with respect to the line interconnecting the first LED lamp and the second LED lamp, the real solution is obtained through determination based on the following conditions, including steps of:

S4: excluding two sets of solution representing a position above the first LED lamp and the second LED lamp considering the fact that the position of the receiver is below the first LED lamp and the second LED lamp;

S5: obtaining a single real solution out of the remaining two sets of solution by restricting the receiver in movement on any side of the plane consisting of the first LED lamp, the second LED lamp and the origin;

S6: obtaining the coordinate of the receiver as $((\hat{x}_{r1}+\hat{x}_{r2})/2, (\hat{y}_{r1}+\hat{y}_{r2})/2, (\hat{z}_{r1}+\hat{z}_{r2})/2)$ through the single set of solution, in which the orientation angle η of the receiver has a value expressed by the formula (13) as:

$$\hat{\eta} = \text{sign}(\hat{y}_{r2} - \hat{y}_{r1})\arccos\left[\frac{(\hat{x}_{r2} - \hat{x}_{r1})}{\sqrt{(\hat{x}_{r1} - \hat{x}_{r2})^2 + (\hat{y}_{r1} - \hat{y}_{r2})^2}}\right] \qquad (13)$$

where sign is the sign function.

6. The 3D wireless optical positioning method of claim 1, wherein the number of the LED lamps is defined depending on the region where they are to be positioned.

7. A 3D wireless optical positioning system comprising:
LED lamps including a first LED lamp and a second LED lamp with a coordinate of $(x_{t1}, y_{t1}, z_{t1})$ and $(x_{t2}, y_{t2}, z_{t2})$ respectively, arranged on the ceiling to transmit optical information and provide illumination;
a receiver provided with a first photodetector and a second photodetector with a coordinate of $(\hat{x}_{r1}, \hat{y}_{r1}, \hat{z}_{r1})$ and $(\hat{x}_{r2}, \hat{y}_{r2}, \hat{z}_{r2})$ respectively, arranged on a receiving plane to receive the optical information;
wherein a distance between the first photodetector and the second photodetector is defined as l, meanwhile the first photodetector and the second photodetector both face upwards on the receiving plane, a middle point between the first photodetector and the second photodetector defines an actual position of a receiving terminal to be predicted, and a direction from the first photodetector to the second photodetector defines an orientation of the receiving terminal, that is, an included angle between a line interconnecting the first photodetector and the second photodetector and the positive half of the X axis is a orientation angle η;
through the Time of Arrival principle, the time required for the optical signal to be transmitted from the first LED lamp and the second LED lamp to and received by the first photodetector and the second photodetector respectively is measured, and the propagation time is multiplied by the speed of light to calculate a distance $d_1$ between the first LED lamp and the first photodetector, a distance $d_2$ between the second LED lamp and the first photodetector, a distance $d_3$ between the first LED lamp and the second photodetector and a distance $d_4$ between the second LED lamp and the second photodetector; and
an actual position and orientation angle of the receiver are obtained based on a geometrical relationship between the LED lamps and the receiver in the XYZ coordinate system, the first photodetector and the second photodetector having a distance determined as l therebetween and being situated in the same receiving plane, the receiver being situated below the first LED lamp and the second LED lamp, the range where the receiver is to be positioned being on any side of the plane consisting of the first LED lamp, the second LED lamp and the origin.

8. The 3D wireless optical positioning system of claim 7, wherein the first LED lamp and the second LED lamp and the first photodetector and the second photodetector have synchronized operation time.

9. The 3D wireless optical positioning system of claim 7, wherein a set of equations for the distances $d_1$ to $d_4$ in the XYZ coordinate system is obtained based on the geometrical relationship between the LED lamps and the receiver in the XYZ coordinate system:

$$d_1^2 = (\hat{x}_{r1} - x_{t1})^2 + (\hat{y}_{r1} - y_{t1})^2 + (\hat{z}_{r1} - z_{t1})^2 \quad (1)$$

$$d_2^2 = (\hat{x}_{r1} - x_{t2})^2 + (\hat{y}_{r1} - y_{t2})^2 + (\hat{z}_{r1} - z_{t2})^2 \quad (2)$$

$$d_3^2 = (\hat{x}_{r2} - x_{t1})^2 + (\hat{y}_{r2} - y_{t1})^2 + (\hat{z}_{r2} - z_{t1})^2 \quad (3)$$

$$d_4^2 = (\hat{x}_{r2} - x_{t2})^2 + (\hat{y}_{r2} - y_{t2})^2 + (\hat{z}_{r2} - z_{t2})^2 \quad (4)$$

meanwhile, supplementary equations are obtained as the first photodetector and the second photodetector have a distance determined as/therebetween and are situated in the same receiving plane:

$$l^2 = (\hat{x}_{r2} - \hat{x}_{r1})^2 + (\hat{y}_{r2} - \hat{y}_{r1})^2 + (\hat{z}_{r2} - \hat{z}_{r1})^2 \quad (5)$$

$$\hat{z}_{r2} = \hat{z}_{r1} \quad (6); \text{and}$$

given the known $d_1$, $d_2$, $d_3$ and $d_4$ and the formulas (5) and (6) and in combination with the fact that the receiver is situated below the first LED lamp and the second LED lamp and the range where the receiver is to be positioned is on any side of the plane consisting of the first LED lamp, the second LED lamp and the origin, the actual position of the receiver $((\hat{x}_{r1} + \hat{x}_{r2})/2, (\hat{y}_{r1} + \hat{y}_{r2})/2, (\hat{z}_{r1} + \hat{z}_{r2})/2)$ and the orientation angle of the receiver are obtained through solution of:

$$\hat{\eta} = \text{sign}(\hat{y}_{r2} - \hat{y}_{r1}) \arccos\left[\frac{(\hat{x}_{r2} - \hat{x}_{r1})}{\sqrt{(\hat{x}_{r1} - \hat{x}_{r2})^2 + (\hat{y}_{r1} - \hat{y}_{r2})^2}}\right]. \quad (13)$$

10. The 3D wireless optical positioning system of claim 9, wherein the first LED lamp, the second LED lamp, the first photodetector and the second photodetector are provided with a time synchronization device.

* * * * *